United States Patent
Kumagai et al.

(10) Patent No.: US 7,136,224 B2
(45) Date of Patent: Nov. 14, 2006

(54) REAR PROJECTION SCREEN WITH SHIFTED LENS

(75) Inventors: Yoshihiro Kumagai, Niigata (JP); Ichiro Matsuzaki, Tokyo (JP)

(73) Assignee: Kuraray Co., Ltd., Kurashiki (JP)

( * ) Notice: Subject to any disclaimer, the term of this patent is extended or adjusted under 35 U.S.C. 154(b) by 36 days.

(21) Appl. No.: 10/502,642

(22) PCT Filed: Feb. 4, 2003

(86) PCT No.: PCT/JP03/01108

§ 371 (c)(1),
(2), (4) Date: Aug. 2, 2004

(87) PCT Pub. No.: WO03/067327

PCT Pub. Date: Aug. 14, 2003

(65) Prior Publication Data
US 2005/0117212 A1    Jun. 2, 2005

(30) Foreign Application Priority Data
Feb. 4, 2002    (JP) .............................. 2002-027375

(51) Int. Cl.
*G03B 21/60* (2006.01)
(52) U.S. Cl. ...................... 359/457; 359/460; 359/453; 359/456
(58) Field of Classification Search ................ 359/443, 359/460, 452–457
See application file for complete search history.

(56) References Cited

U.S. PATENT DOCUMENTS

| | | | | |
|---|---|---|---|---|
| 2,618,198 A | * | 11/1952 | Luboshez | ................... 359/456 |
| 5,066,099 A | * | 11/1991 | Yoshida et al. | .............. 359/457 |
| 5,400,114 A | * | 3/1995 | Yoshida et al. | .............. 359/457 |
| 5,485,308 A | * | 1/1996 | Hirata et al. | ................. 359/457 |
| 6,292,294 B1 | * | 9/2001 | Takahashi et al. | ........... 359/455 |
| 6,597,502 B1 | * | 7/2003 | Takahashi et al. | ........... 359/456 |
| 2002/0149846 A1 | * | 10/2002 | Goto et al. | .................. 359/456 |

FOREIGN PATENT DOCUMENTS

| | | |
|---|---|---|
| JP | 8-101459 | 4/1996 |
| JP | 9-120101 | 5/1997 |
| JP | 9-269546 | 10/1997 |
| JP | 11-295818 | 10/1999 |
| JP | 2002-107834 | 4/2002 |

OTHER PUBLICATIONS

U.S. Appl. No. 10/769,914, filed Feb. 3, 2004, Kumagai et al.

* cited by examiner

*Primary Examiner*—W. B. Perkey
*Assistant Examiner*—Magda Cruz
(74) *Attorney, Agent, or Firm*—Oblon, Spivak, McClelland, Maier & Neustadt, P.C.

(57) ABSTRACT

An object of the invention is to provide a rear projection screen that has a high contrast and produces high-quality images. The object is achieved by a rear projection screen and rear projection display apparatus having the same. This rear projection screen contains a vertical lenticular lens sheet on the viewer side, and the vertical lenticular lens sheet includes a lenticular lens capable of vertically refracting the incident light on its incident surface, black stripes in the vicinity of the focus of the lenticular lens in portions where the incident light does not pass through, and a flat surface on its viewer side.

7 Claims, 5 Drawing Sheets

Fig: 7  PRIOR ART
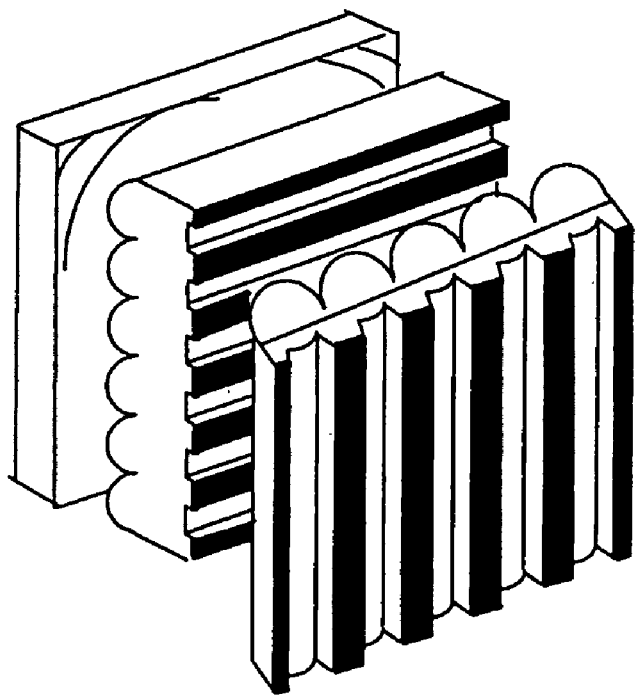
Fig. 8  PRIOR ART
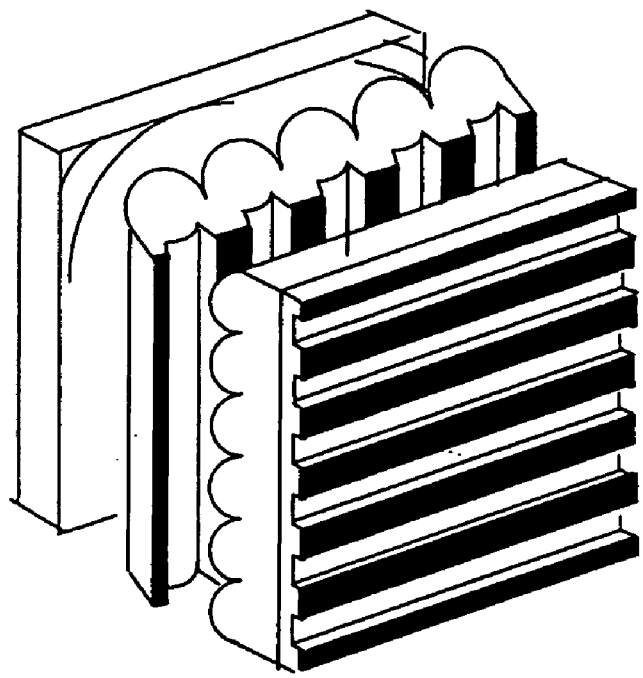

REAR PROJECTION SCREEN WITH SHIFTED LENS

TECHNICAL FIELD

The present invention relates to a rear projection screen for use in a rear projection display apparatus which serves to enlarge and project an image on a screen to be observed from the front side, such as a CRT, a liquid crystal panel or a digital mirror device in which the angle of a fine mirror is controlled based on an image signal and the reflected light reflected by the mirror is used. More specifically, it relates to a rear projection screen that can inhibit a deceased contrast caused by external light, which decreased contrast is a problem in rear projection display apparatus of this type.

BACKGROUND ART

Conventional rear projection screens for use in rear projection display apparatus generally comprise two lens sheets including a Fresnel lens sheet and a horizontal lenticular lens sheet containing a light-diffusing member. However, these rear projection screens invite decreased contrast of the screen because external light from lighting at the ceiling of a room or light reflected from surrounding walls is scattered and reflected at the surface of the screen.

To prevent the reflection of the incident external light and to improve the image contrast, a screen having three sheets including two lenticular lens sheets arranged in a perpendicular direction to each other has been proposed. This type of screens can be found in, for example, Japanese Unexamined Patent Application Publications No 07-5573 and No. 08-101459. In these screens, the ratio of black stripes can be substantially increased and the contrast can be improved by using the lenticular lens sheets arranged in a perpendicular direction to each other.

However, in a screen shown in FIG. 7 including a Fresnel lens sheet, a vertical lenticular lens sheet and a horizontal lenticular lens sheet in this order from a projector side, the incident light is reflected at the surface of the vertical lenticular lens and emerges as stray light toward a viewer, thereby causing image deterioration. In a screen shown in FIG. 8 including a Fresnel lens sheet, a horizontal lenticular lens sheet and a vertical lenticular lens sheet in this order from a projector side, light from a light source positioned above the viewer, such as lighting, is vertically diffused and reflected at fine protrusions and depressions and at the edges of the black stripes on the viewer side of the vertical lenticular lens sheet and appears an image of the light source elongated in a vertical direction, thereby deteriorating the image contrast and decreasing the image quality.

Accordingly, an object of the present invention is to solve the above problems while keeping high contrast performance.

DISCLOSURE OF THE INVENTION

Specifically, the present invention solves the above problems and provides, in an aspect, a rear projection screen for use in a rear projection display apparatus, comprising at least two lens sheets including a vertical lenticular lens sheet on the nearest side to a viewer, the vertical lenticular lens sheet comprising a lenticular lens capable of vertically refracting the incident light on its incident surface, black stripes in the vicinity of the focus of the lenticular lens in portions where the incident light does not pass through, and a flat surface on its viewer side.

The present invention provides the rear projection sheet comprising a Fresnel lens sheet, a horizontal lenticular lens sheet capable of horizontally refracting the incident light, and the vertical lenticular lens sheet in this order from the incident side of the incident light.

The present invention provides the rear projection screen in which a layer having the flat surface of the vertical lenticular lens sheet on the nearest side to the viewer is a coated layer of a transparent or colored resin.

The present invention further provides the rear projection screen in which the lens center of the Fresnel lens sheet is arranged upward with respect to the mechanical center of the screen, and, in relation to this arrangement, the black stripes of the vertical lenticular lens sheet are shifted with respect to the vertical lenticular lens.

The present invention further provides a rear projection display apparatus comprising the rear projection screen.

BRIEF DESCRIPTION OF THE DRAWINGS

FIGS. 7 and 8 each illustrates a conventional technology.

BEST MODE FOR CARRYING OUT THE INVENTION

Figure 1:
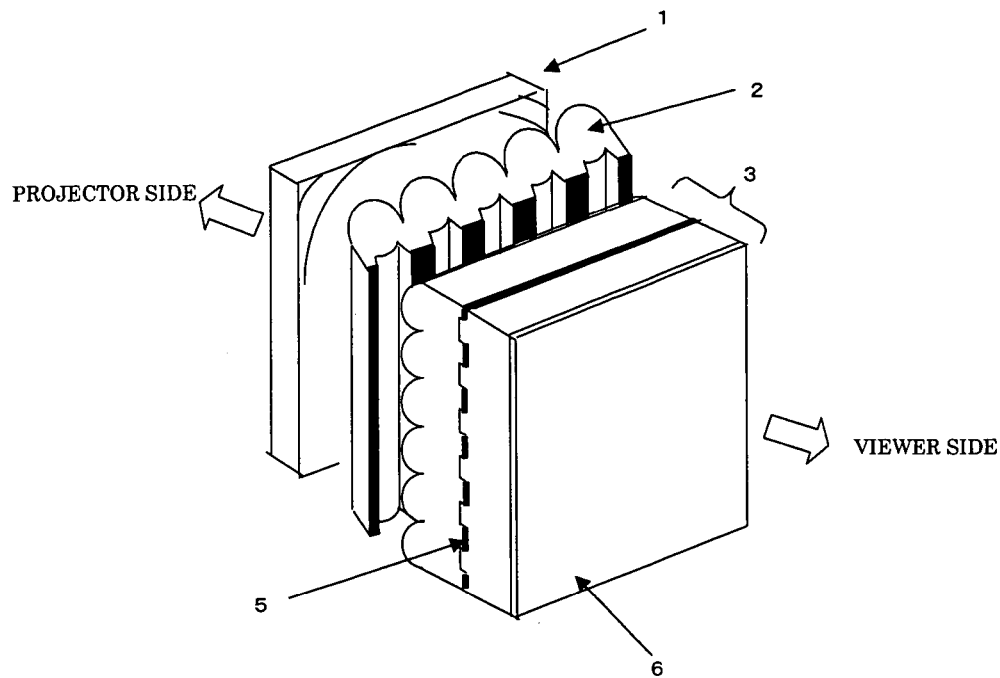
FIG. 1 is a diagram showing an embodiment of the present invention.

FIG. 1 illustrates an embodiment of the present invention. This embodiment comprises a Fresnel lens sheet 1, a horizontal lenticular lens sheet 2 and a vertical lenticular lens sheet 3 in this order from the incident side of incident light. The vertical lenticular lens sheet 3 has a lenticular lens for vertically refracting the incident light on the incident side, black stripe 5 at the focus of the lenticular lens in portions where the incident light does not pass through, and a flat surface 6 on the nearest side to the viewer.

Figure 3:
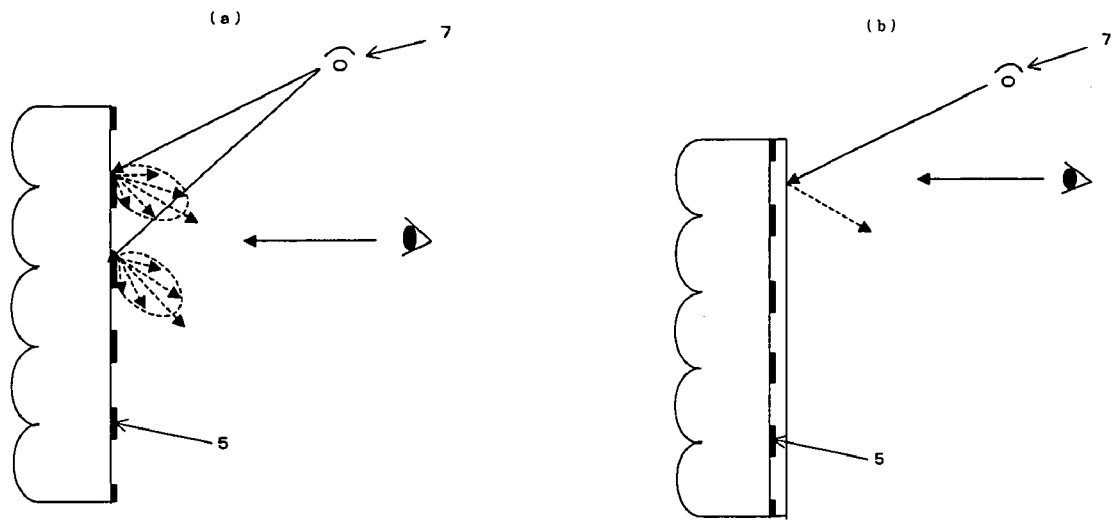
FIG. 3 shows how the present invention

When a rear projection screen having a vertical lenticular lens sheet arranged on the viewer side shown in FIG. 8 is used, part of the external light coming into the rear projection screen from a luminaire 7 such as a ceiling fluorescent lamp is scattered and reflected in the vertical direction by black stripes arranged on the viewer side of the vertical lenticular lens sheet (FIG. 3a). As a result, an image of the luminaire 7, which is vertically elongated, reaches the viewer, leading to a markedly deteriorated image quality. This problem can be avoided in the rear projection screen of the present invention by making the viewer side of the vertical lenticular lens sheet 3 a flat surface 6 (FIG. 3b). The viewer side of the vertical lenticular lens sheet can be flattened, for example, by coating with a transparent coating agent or by adhering a resin sheet or film having a flat surface with the lens sheet using a transparent adhesive without the interposition of an air space. For better contrast, the flat surface in the present invention is preferably a mirror-finished surface. However, even when the flat surface is an anisotropically scattering surface by means of, for example, a light-diffusing member or embossing, the above advantages can be obtained, since unnatural reflection elongated only in the vertical direction can be avoided.

The vertical lenticular lens sheet for use in the present invention may have any pitch, focal length of the lens and ratio of the width of black stripe to the lenticular lens pitch ("black stripe ratio"). However, for satisfactory diffusing properties and contrast, the ratio of the focal length of the lenticular lens to the lenticular lens pitch (focal length/lenticular lens pitch) is preferably in a range from 1.3 to 3.0 and the black stripe ratio is preferably in a range from 60% to 80% and more preferably from 70% to 80%. In the use of a rear projection display apparatus, which displays images using fine pixels, such as a liquid crystal panel, the lenticular lens pitch is preferably 0.5 mm or less and more preferably 0.3 mm or less for reducing moire caused by the interference between the pixels and the lenses having different pitches.

A layer constituting the flat surface of the vertical lenticular lens sheet may partially include a layer containing a light-diffusing member. By arranging such a layer containing a light-diffusing member, the moire caused by the interference among the individual lens sheets having different pitches can be reduced. However, it leads to a decreased brightness of the screen and should be determined according to necessity. Where necessary, the vertical lenticular lens sheet may have an anti reflective layer on the viewer side for reducing the reflection and may be subjected to hard coating for preventing the damage of the surface.

The lens sheets for use in the present invention can be produced according to a conventional procedure such as 2P (photo-polymer) molding, extrusion molding or pressing.

EXAMPLE 1

Figure 2:
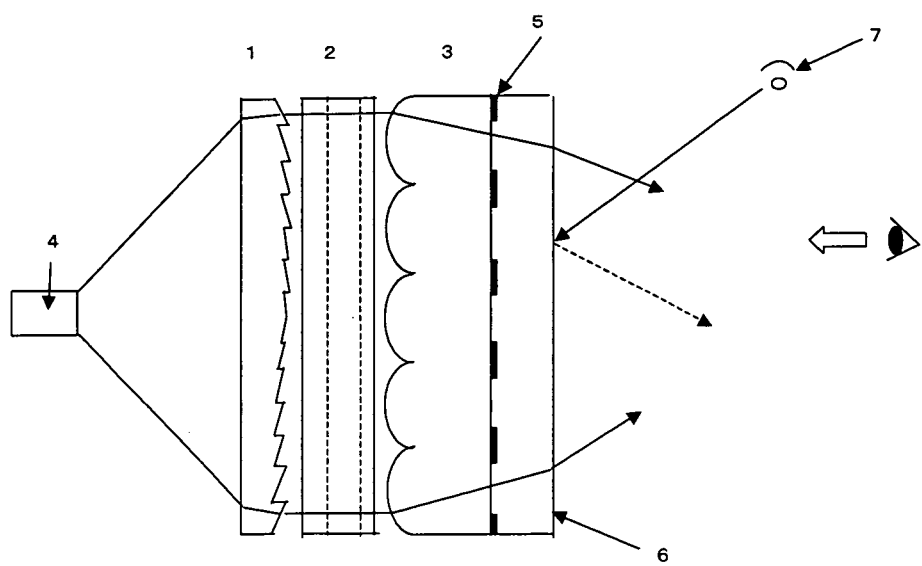
FIG. 2 is a diagram showing the light path in the embodiment of FIG. 1.

FIGS. 1 and 2 are a schematic perspective view of a rear projection screen and a vertical sectional view of the light path thereof, respectively, according to a first embodiment of the present invention.

The incident light projected from a projector comes into a Fresnel lens sheet 1 and is concentrated toward the viewer side. The incident light then comes into a lenticular lens sheet 2 having lenticular lenses on both sides and is oriented or aligned in the horizontal direction. With reference to FIG. 2, the incident light is not refracted in the vertical direction and travels in a straight line, since the lenticular lens sheet 2 does not include a light-diffusing member. The incident light passes through a vertical lenticular lens sheet 3 and is refracted in the vertical direction. The vertical lenticular lens sheet 3 has lenticular lenses on the projector side for refracting the incident light in the vertical direction, black stripes 5 on the viewer side and an optically transparent resin sheet to constitute a flat surface 6 on the most viewer side. The black stripes 5 and the optically transparent resin sheet are integrally adhered with the interposition of a photo-curable resin.

The Fresnel lens sheet was produced with 2P molding. The substrates of the horizontal lenticular lens sheet and the vertical lenticular lens sheet were produced by extrusion, and the black stripes were formed with screen-printing. The vertical lenticular lens sheet used herein comprises a lenticular lens having a lens pitch of 0.45 mm and a focal length of 1.09 mm on one side and black stripes having a black stripe ratio of 60% and a height of 55 µm on the outgoing face of the lenticular lens sheet.

The above-prepared rear projection screen was integrated into a commercially available rear-projection television set and was observed under lighting from a ceiling fluorescent light to find that the image had good appearance without reflection of the ceiling lighting elongated in the vertical direction. The front reflection luminance in the case where no image is displayed was determined and was found to be 1.62 cd/m$^2$.

COMPARATIVE EXAMPLE 1

A rear projection screen was prepared by the procedure of Example 1, except that an optical resin sheet was not adhered to the vertical lenticular lens sheet (FIG. 8).

The above-prepared rear projection screen was integrated into a commercially available rear-projection television set and was observed under lighting from a ceiling fluorescent lamp to find that reflection of an image of the ceiling lighting elongated in the vertical direction and whitish areas were observed on the screen. The front reflection luminance in the case where no image is displayed was determined and was found to be 2.42 cd/m$^2$, about 50% higher than Example 1.

EXAMPLE 2

Figure 4:
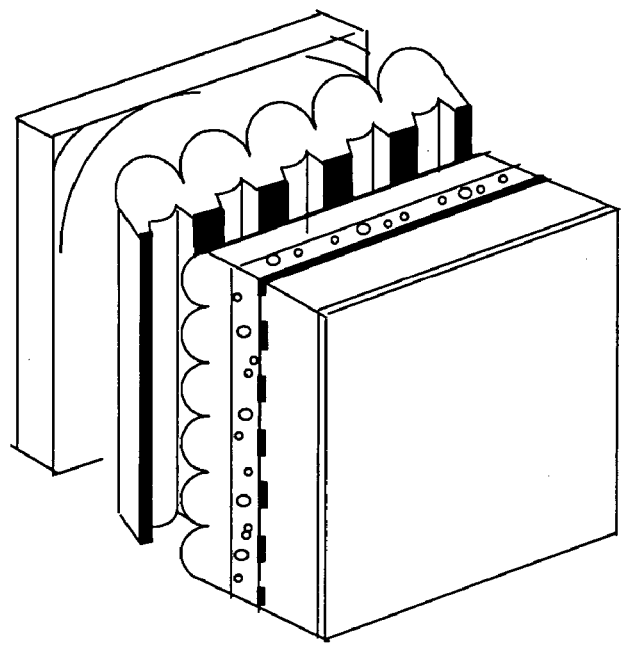
FIGS. 4 and 5 illustrate an embodiment of the present

A rear projection screen was produced by the procedure of Example 1, except that a layer containing a diffusing member was further formed in the vertical lenticular lens sheet (FIG. 4). The layer containing the diffusing member was arranged in the vicinity of the focus of the vertical lenticular lens at such a position that the optical eclipse or vignetting by the black stripes attains the minimum.

Figure 5:
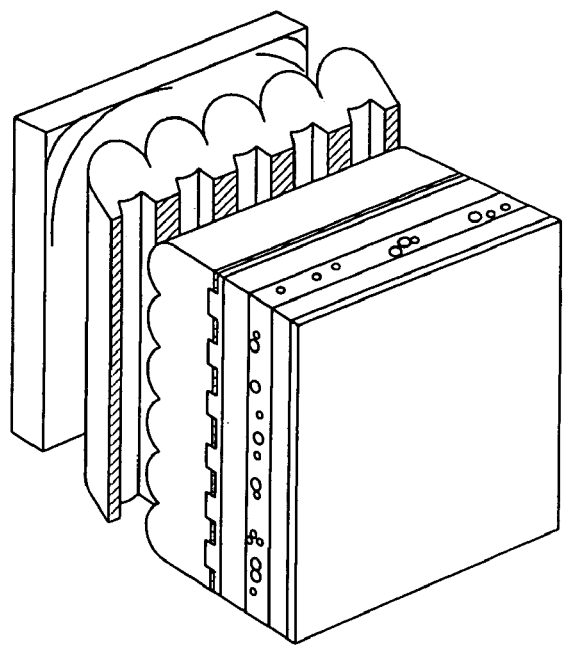

The above-prepared rear projection screen had operation and advantages that the moire between, for example, the Fresnel lens sheet and the horizontal lenticular lens sheet is reduced as compared with Example 1. In this example, the layer containing the diffusing member is arranged on the incident side from the black stripes, but similar advantages can be obtained when it is arranged on the viewer side as shown in FIG. 5.

EXAMPLE 3

A rear projection screen was produced by the procedure of Example 1, except that a vertical lenticular lens sheet arranged on the nearest side to the viewer was prepared in the following manner. Specifically, it was prepared by arranging a lenticular lens for vertically refracting the incident light on a projector side; forming black stripes on the viewer side; and applying a photo-curable resin using a coater, curing the resin and transferring a mirror-finished surface of a metal plate thereto to thereby form a flat surface on the nearest side to the viewer. This rear projection screen exhibited similar advantages as Example 1.

EXAMPLE 4

A rear projection screen was produced by the procedure of Example 1, except that a vertical lenticular lens sheet arranged on the nearest side to the viewer was prepared in the following manner. Specifically, it was prepared by arranging a lenticular lens for vertically refracting the incident light on a projector side; forming black stripes on the viewer side; and applying a photo-curable resin using a coater, curing the resin and transferring an embossed surface of a metal plate thereto to thereby form a flat surface on the nearest side to the viewer. This rear projection screen showed somewhat whitish areas on the screen, but reflection of the ceiling lighting elongated in the vertical direction was not observed.

EXAMPLE 5

Figure 6B:
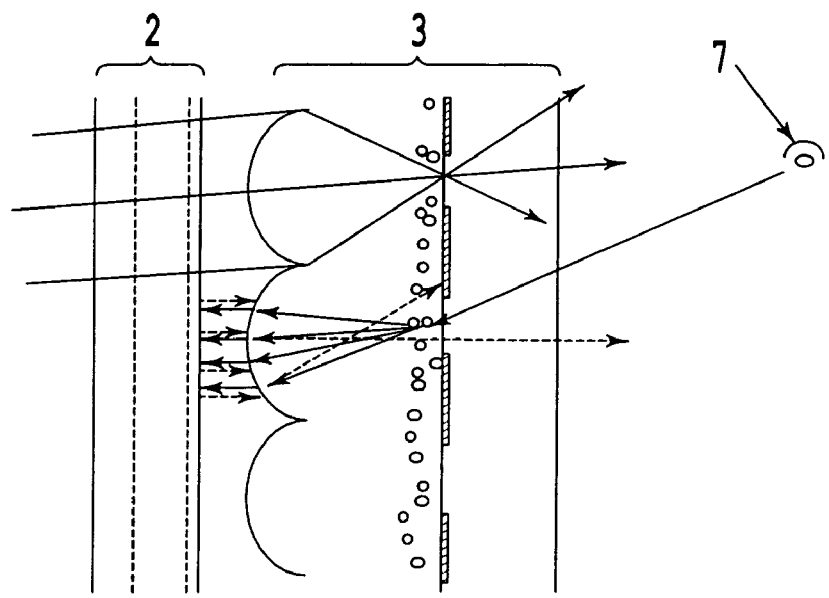
FIGS. 6a–6c show another embodiment of the present invention. technology.
Figure 6A:
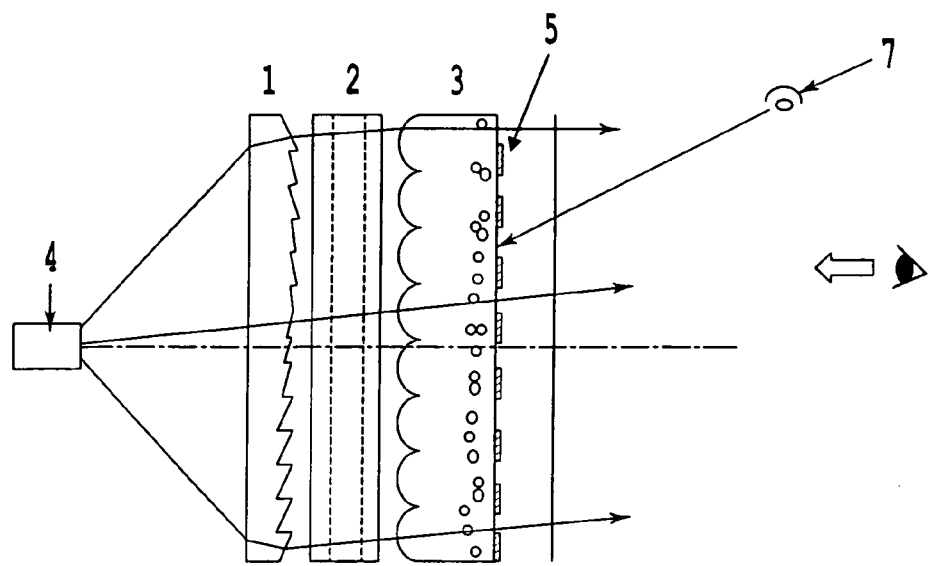
Figure 6C:
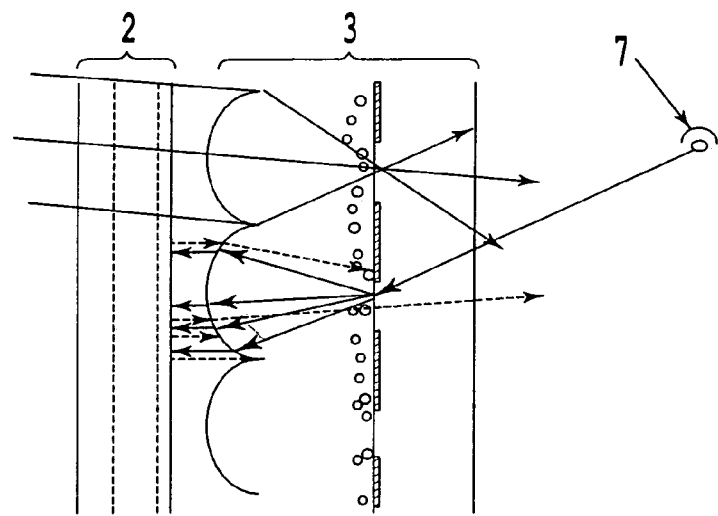

FIGS. 6a–6c are a vertical sectional view illustrating how a rear projection screen, in particular its vertical lenticular lens sheet, according to a fifth embodiment of the present invention operates.

A rear projection screen was produced by the procedure of Example 2, except the following procedures. Specifically, the mechanical position between the projector and the Fresnel lens sheet was set so that the angle between a first line and a second line was 6 degrees, wherein the first line connects between the light-exit point of the projector and the mechanical center of the screen, and the second line connects between the light emergent point of the projector and the center of Fresnel lens as shown in FIG. 6a. The black stripes 5 of the vertical lenticular lens sheet 3 as shown in FIG. 6a were arranged at the midpoints between focal positions of adjacent upper and lower hills of vertical lenticular lens in the rear projection screen. The required upward shift of the black stripes at the lens center of the Fresnel lens sheet 2 can be approximately determined by multiplying tangent (6 degrees) by the focal length of the vertical lenticular lenses. At the lens center of the Fresnel lens sheet, the incident light coming into the vertical lenticular lenses 3 at an upward angle of 6 degrees (see FIG. 6c) is refracted and is broadened in the vertical direction, and the center of its intensity lies at an upward angle of 6 degrees.

The lens center of the Fresnel lens sheet is arranged upward with respect to the mechanical center of the screen, and, in relation to this arrangement, the black stripes of the vertical lenticular lens sheet are shifted with respect to the vertical lenticular lens as shown in FIGS. 6a–6c.

The external light coming into the rear projection screen comes into the light-diffusing member in the vicinity of the focus of the lenticular lens of the vertical lenticular lens sheet 3 and diffuses toward the inner surface of the vertical lenticular lens sheet 3. The external light reflected at the inner surface returns to the incident side and emerges toward the viewer from portions where the black stripes 5 are absent. The residual external light passing through the vertical lenticular lens comes into and is reflected by the horizontal lenticular lens, comes into the vertical lenticular lens and emerges toward the viewer from portions where the black stripes 5 are absent. By shifting the black stripes 5 upward with respect to the screen, the ratio of the reflected external light absorbed by the black stripes 5 becomes higher, thus improving the image contrast.

INDUSTRIAL APPLICABILITY

The rear projection screen of the present invention has a high contrast, can prevent unnatural reflection of external light such as lighting and can provide a high-quality display apparatus.

The invention claimed is:

1. A rear projection screen for use in a rear projection display apparatus, comprising:

at least two lens sheets including a vertical lenticular lens sheet on the nearest side to a viewer, the vertical lenticular lens sheet comprising,
   a lenticular lens capable of vertically refracting the incident light on its incident surface,
   black stripes in a vicinity of a focus of the lenticular lens in portions where the incident light does not pass through, and
   a flat surface on a viewer side;
a Fresnel lens sheet; and
a horizontal lenticular lens sheet capable of horizontally refracting the incident light, wherein
the Fresnel lens sheet, the horizontal lenticular lens, and the vertical lenticular lens sheet are in this order from the incident side of the incident light, and
a lens center of the Fresnel lens sheet is arranged upward or downward with respect to a mechanical center of the screen, and, in relation to this arrangement, centers of the black stripes of the vertical lenticular lens sheet are shifted with respect to the focus of the vertical lenticular lens.

2. The rear projection screen according to claim 1, wherein a layer having the flat surface of the vertical lenticular lens sheet on the nearest side to the viewer is a coated layer of a transparent or colored resin.

3. The rear projection screen according to claim 1, wherein a layer having the flat surface of the vertical lenticular lens sheet on the nearest side to the viewer is a transparent or colored resin sheet integrally adhered through a transparent adhesive.

4. The rear projection screen according to claim 1, wherein a layer having the flat surface of the vertical lenticular lens sheet on the nearest side to the viewer partially has a layer containing a light-diffusing member in its thickness direction.

5. The rear projection screen according to claim 1, wherein at least one of the Fresnel lens sheet, the horizontal lenticular lens sheet and the vertical lenticular lens sheet has a layer containing a light-diffusing member.

6. The rear projection screen according to claim 1, wherein, in the vertical lenticular lens sheet, the ratio of the focal length of the lenticular lens to the lenticular lens pitch is in a range from 1.3 to 3.0, and the ratio of the width of black stripe to the lenticular lens pitch is in a range from 60% to 80%.

7. A rear projection display apparatus comprising the rear projection screen of claim 1.

* * * * *